US012585954B2

(12) United States Patent
Fan et al.

(10) Patent No.: US 12,585,954 B2
(45) Date of Patent: Mar. 24, 2026

(54) PERFORMANCE OF AUTONOMOUS VEHICLE OPERATION IN VARYING CONDITIONS BY USING IMAGERY GENERATED WITH MACHINE LEARNING FOR SIMULATIONS

(71) Applicant: WING AVIATION LLC, Mountain View, CA (US)

(72) Inventors: Xinzhi Fan, San Mateo, CA (US); Zaven Muradyan, Seattle, WA (US)

(73) Assignee: Wing Aviation LLC, Palo Alto, CA (US)

( * ) Notice: Subject to any disclaimer, the term of this patent is extended or adjusted under 35 U.S.C. 154(b) by 1094 days.

(21) Appl. No.: 17/521,625

(22) Filed: Nov. 8, 2021

(65) Prior Publication Data

US 2023/0142863 A1      May 11, 2023

(51) Int. Cl.
| | |
|---|---|
| *G06N 3/006* | (2023.01) |
| *G06N 3/045* | (2023.01) |
| *G06N 3/088* | (2023.01) |

(52) U.S. Cl.
CPC ............. *G06N 3/088* (2013.01); *G06N 3/006* (2013.01); *G06N 3/045* (2023.01)

(58) Field of Classification Search
CPC ........ G06N 3/088; G06N 3/006; G06N 3/045; G06N 3/094; G06N 3/0455; G06N 3/0475; G06N 3/09

(Continued)

(56) References Cited

U.S. PATENT DOCUMENTS

| | | | |
|---|---|---|---|
| 11,046,430 B1 | 6/2021 | Melton et al. | |
| 11,354,458 B1 * | 6/2022 | Schwalb ................ | G06N 3/006 |

(Continued)

FOREIGN PATENT DOCUMENTS

| | | |
|---|---|---|
| EP | 3125151 A2 | 1/2017 |
| KR | 101083128 B1 * | 5/2010 |

OTHER PUBLICATIONS

Liu "Unsupervised Image-to-Image Translation Networks", arXiv, 2018 (Year: 2018).*

(Continued)

*Primary Examiner* — Helal A Algahaim
*Assistant Examiner* — Shien Ming Chou
(74) *Attorney, Agent, or Firm* — Christensen O'Connor Johnson Kindness PLLC

(57)          ABSTRACT

In some embodiments, a computer-implemented method for simulating an unmanned aerial vehicle (UAV) to improve control system performance is provided. A computing system obtains ground truth aerial imagery for a region that depicts the region during a first state. The computing system determines a route for a simulated UAV within the region. The computing system generates, based on the ground truth aerial imagery, predicted aerial imagery that depicts portions of the region associated with the route. The computing system generates simulated aerial imagery that depicts portions of the region associated with the route during a second state different from the first state by providing the predicted aerial imagery to a machine learning model. The computing system simulates travel of the simulated UAV along the route during the second state by providing the simulated aerial imagery as simulated input to at least one control system of the simulated UAV.

16 Claims, 11 Drawing Sheets

(58) Field of Classification Search
USPC .......................................................... 701/523
See application file for complete search history.

(56) References Cited

U.S. PATENT DOCUMENTS

| | | | |
|---|---|---|---|
| 2018/0094931 A1 | 4/2018 | Taylor et al. | |
| 2018/0373269 A1 | 12/2018 | Cantrell | |
| 2019/0025773 A1* | 1/2019 | Yang | G06V 10/803 |
| 2020/0226426 A1* | 7/2020 | Jarquin Arroyo | G06F 18/217 |
| 2022/0318464 A1* | 10/2022 | Xu | G05D 1/0212 |
| 2023/0119620 A1* | 4/2023 | Chow | G01C 21/3602 |
| | | | 701/436 |
| 2024/0247941 A1* | 7/2024 | Chow | G01C 21/3602 |

OTHER PUBLICATIONS

Schleiss, M., "Translating Aerial Images Into Street-Map-Like Representations for Visual Self-Localization of UAVs," The International Archives of the Photogrammetry, Remote Sensing and Spatial Information Sciences, vol. XLII-2/W13, ISPRS Geospatial Week, Enschede, The NetherlandsJun. 10-14, 2019, pp. 575-580.

Bowles, C., et al., "GAN Augmentation: Augmenting Training Data using Generative Adversarial Networks," arXiv:1810.10863v1 [cs. CV], Oct. 25, 2018, 12 pages.

Ren, C.X., et al., "Deep Snow: Synthesizing Remote Sensing Imagery with Generative Adversarial Nets," arXiv:2005.08892v1 [eess.IV], May 18, 2020, 10 pages.

Regmi, K., et al., "Cross-View Image Synthesis using Conditional GANs," CVPR Paper, 2018, pp. 3501-3510.

Milz, S., et al., "Aerial GANeration: Towards Realistic Data Augmentation Using Conditional GANs," ECCV, 2018, pp. 1-14.

Liu, M-Y., et al., "Unsupervised Image-to-Image Translation Networks," 31st Conference on Neural Information Processing Systems (NIPS 2017), Long Beach, CA, USA, pp. 1-9.

International Search Report and Written Opinion mailed Dec. 13, 2022, in corresponding International Patent Application No. PCT/US2022/043246, 8 pages.

* cited by examiner

800

START A METHOD OF IMPROVING
AUTONOMOUS CONTROL LOGIC OF A UAV
USING SIMULATED IMAGERY

802

AN IMAGERY COLLECTION ENGINE OF A UAV SIMULATION COMPUTING
SYSTEM RECEIVES GROUND TRUTH AERIAL IMAGERY FOR A REGION THAT
DEPICTS THE REGION DURING A FIRST STATE

804

THE IMAGERY COLLECTION ENGINE STORES THE GROUND TRUTH AERIAL
IMAGERY IN AN IMAGERY DATA STORE OF THE UAV SIMULATION COMPUTING
SYSTEM

806

A UAV SIMULATION ENGINE OF THE UAV SIMULATION COMPUTING SYSTEM
DETERMINES A ROUTE FOR A SIMULATED UAV WITHIN THE REGION

808

AN IMAGERY GENERATION ENGINE OF THE UAV SIMULATION COMPUTING
SYSTEM DETERMINES PREDICTED AERIAL IMAGERY THAT DEPICTS PORTIONS
OF THE REGION ASSOCIATED WITH THE ROUTE BASED ON THE GROUND
TRUTH AERIAL IMAGERY IN THE IMAGERY DATA STORE

810

THE IMAGERY GENERATION ENGINE STORES THE PREDICTED AERIAL IMAGERY
IN THE IMAGERY DATA STORE

812

THE IMAGERY GENERATION ENGINE RETRIEVES A MACHINE LEARNING MODEL
FROM A MODEL DATA STORE OF THE UAV SIMULATION COMPUTING SYSTEM

814

THE IMAGERY GENERATION ENGINE GENERATES SIMULATED AERIAL IMAGERY
THAT DEPICTS PORTIONS OF THE REGION ASSOCIATED WITH THE ROUTE
DURING A SECOND STATE BY PROVIDING THE PREDICTED AERIAL IMAGERY TO
THE MACHINE LEARNING MODEL

816

THE IMAGERY GENERATION ENGINE STORES THE SIMULATED AERIAL IMAGERY
IN THE IMAGERY DATA STORE

PERFORMANCE OF AUTONOMOUS VEHICLE OPERATION IN VARYING CONDITIONS BY USING IMAGERY GENERATED WITH MACHINE LEARNING FOR SIMULATIONS

TECHNICAL FIELD

This disclosure relates generally to autonomous vehicles, and in particular but not exclusively, relates to improving at least one of perception, planning, and control performance for autonomous vehicles.

BACKGROUND

Autonomous vehicles, including but not limited to unmanned aerial vehicles (UAVs), are becoming more prevalent. UAVs are currently being used to make autonomous deliveries of goods over wide geographical areas, to obtain aerial imagery of remote geographical areas, and to perform various other tasks. Typically, a UAV makes autonomous control decisions based on data (such as imagery) collected by sensors present on the UAV.

BRIEF SUMMARY

In some embodiments, a non-transitory computer-readable medium having logic stored thereon is provided. The logic, in response to execution by a computing system, causes the computing system to perform actions for simulating an unmanned aerial vehicle (UAV) to improve control system performance. The actions include obtaining, by the computing system, ground truth aerial imagery for a region, where the ground truth aerial imagery depicts the region during a first state; determining, by the computing system, a route for a simulated UAV within the region; generating, by the computing system based on the ground truth aerial imagery, predicted aerial imagery that depicts portions of the region associated with the route; generating, by the computing system, simulated aerial imagery that depicts portions of the region associated with the route during a second state different from the first state by providing the predicted aerial imagery to a machine learning model; and simulating, by the computing system, travel of the simulated UAV along the route during the second state by providing the simulated aerial imagery as simulated input to at least one control system of the simulated UAV.

In some embodiments, a computer-implemented method for simulating an unmanned aerial vehicle (UAV) to improve control system performance is provided. A computing system obtains ground truth aerial imagery for a region. The ground truth aerial imagery depicts the region during a first state. The computing system determines a route for a simulated UAV within the region. The computing system generates, based on the ground truth aerial imagery, predicted aerial imagery that depicts portions of the region associated with the route. The computing system generates simulated aerial imagery that depicts portions of the region associated with the route during a second state different from the first state by providing the predicted aerial imagery to a machine learning model. The computing system simulates travel of the simulated UAV along the route during the second state by providing the simulated aerial imagery as simulated input to at least one control system of the simulated UAV.

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

FIG. 8A-FIG. 8B are a flowchart that illustrates a non-limiting example embodiment of a method of verifying and/or improving autonomous control logic of a UAV using simulated imagery according to various aspects of the present disclosure.

DETAILED DESCRIPTION

While many different types of sensors may be deployed on a UAV to allow control logic to generate appropriate autonomous control decisions, obtaining test sensor data for use in simulated development of such control logic can be difficult. Ideally, test sensor data, such as aerial imagery, would be collected that matches as closely as possible the sensor data that would be encountered by a UAV deployed in the field. However, because the appearance of aerial imagery may change greatly under different states (including but not limited to different weather states and lighting states), it is not typically possible to collect sample sensor data for all intended operating regions in all possible operating states. What is desired are techniques that allow for the simulation of sensor data from other operating states based on ground truth sensor data collected during a single state, such that the simulated sensor data may be used to simulate performance of a UAV in unfamiliar scenarios to verify and/or improve the performance of its control logic before real-world deployment.

Figure 1:
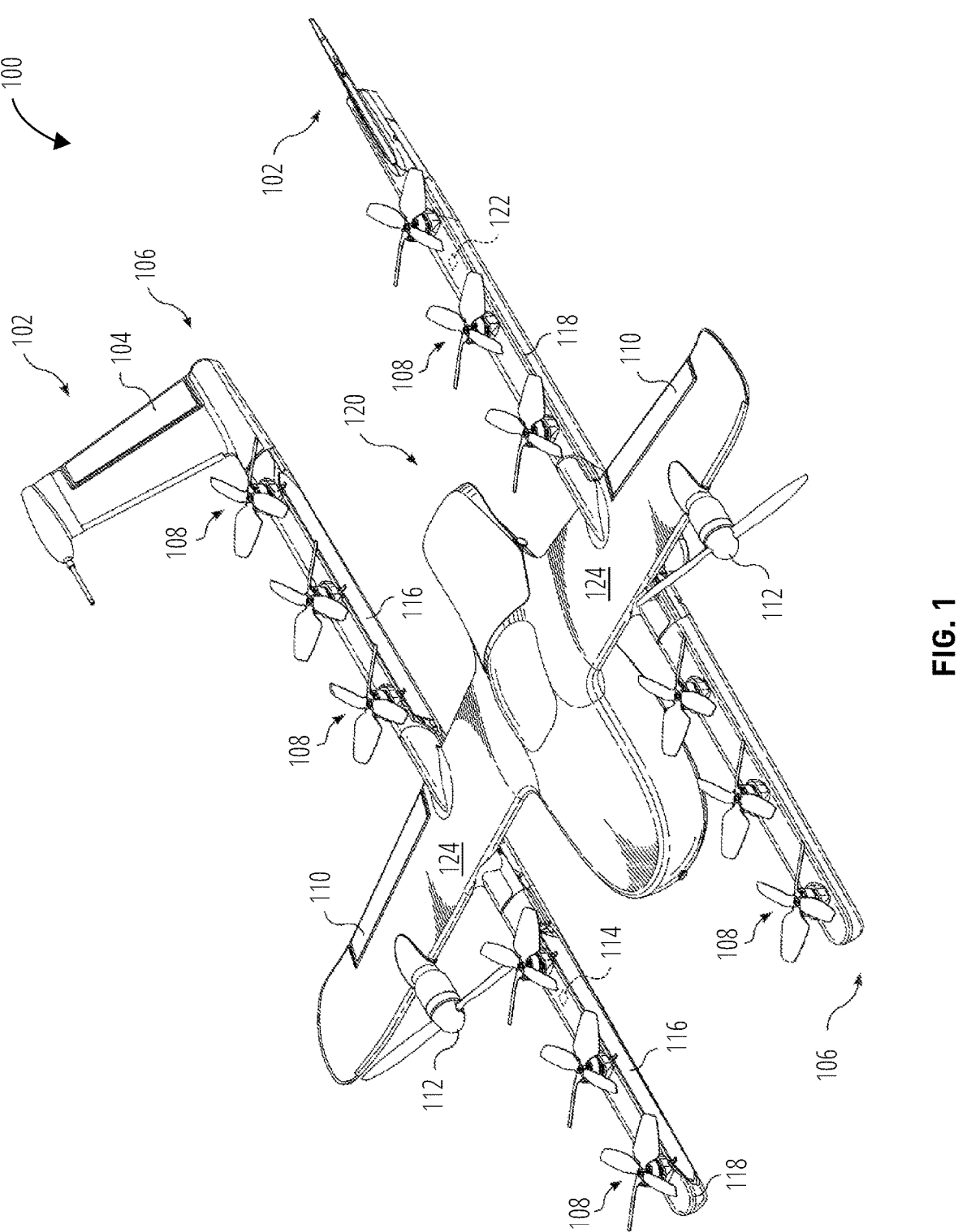
FIG. 1 and FIG. 2 illustrate an aerial vehicle or UAV 100, in accordance with an embodiment of the present disclosure.
Figure 2:
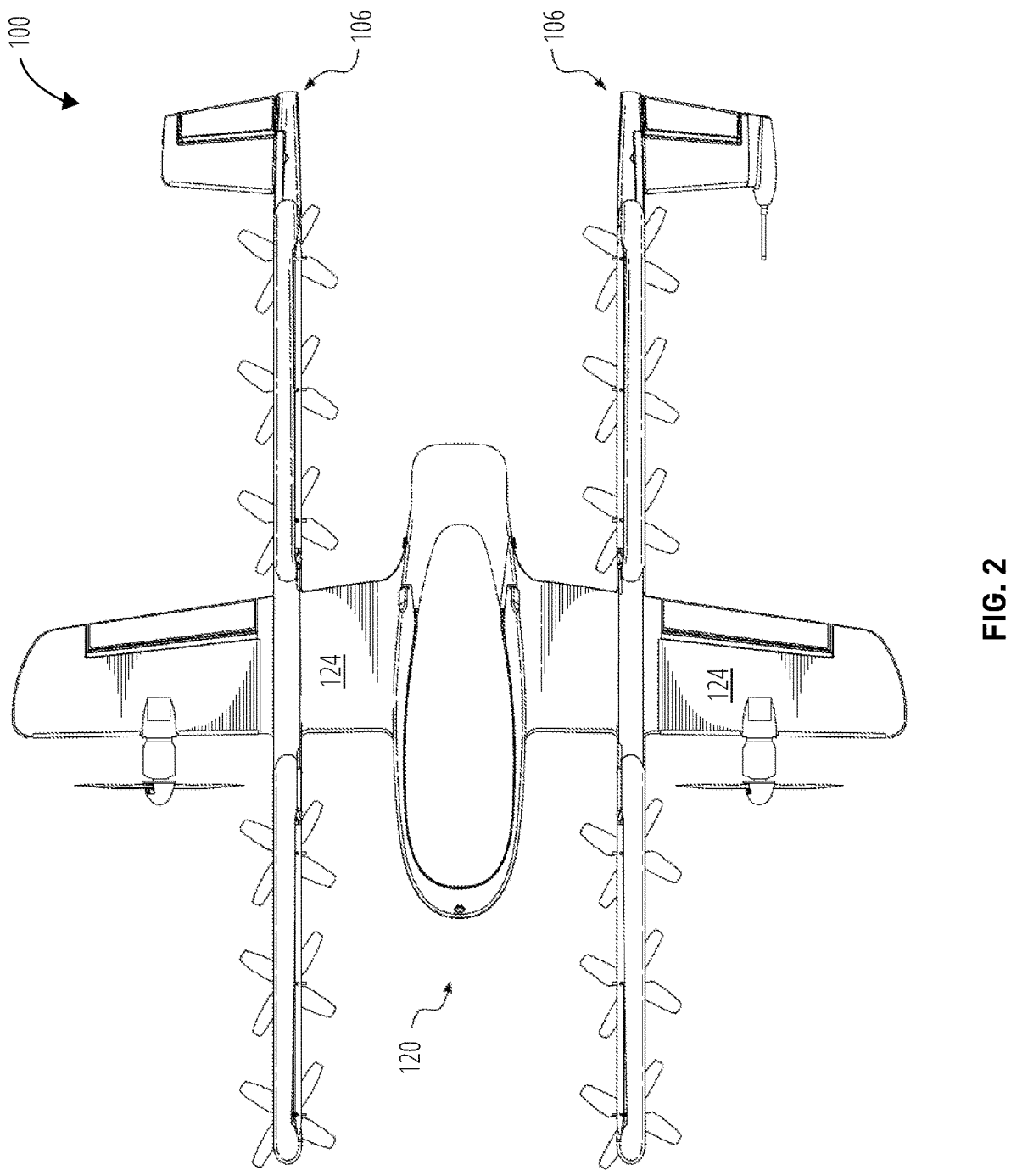

FIG. 1 and FIG. 2 illustrate an aerial vehicle or UAV 100, in accordance with an embodiment of the present disclosure.

The illustrated embodiment of UAV 100 is a vertical takeoff and landing (VTOL) unmanned aerial vehicle (UAV) that includes separate propulsion units 112 and propulsion units 108 for providing horizontal and vertical propulsion, respectively. UAV 100 is a fixed-wing aerial vehicle, which as the name implies, has a wing assembly 124 that can generate lift based on the wing shape and the vehicle's forward airspeed when propelled horizontally by propulsion units 112. FIG. 1 is a perspective top view illustration of UAV 100 while FIG. 2 is a bottom side plan view illustration of UAV 100.

The illustrated embodiment of UAV 100 includes a fuselage 120. In one embodiment, fuselage 120 is modular and includes a battery module, an avionics module, and a mission payload module. These modules are detachable from each other and mechanically securable to each other to contiguously form at least a portion of the fuselage 120 or UAV main body.

Figure 3:
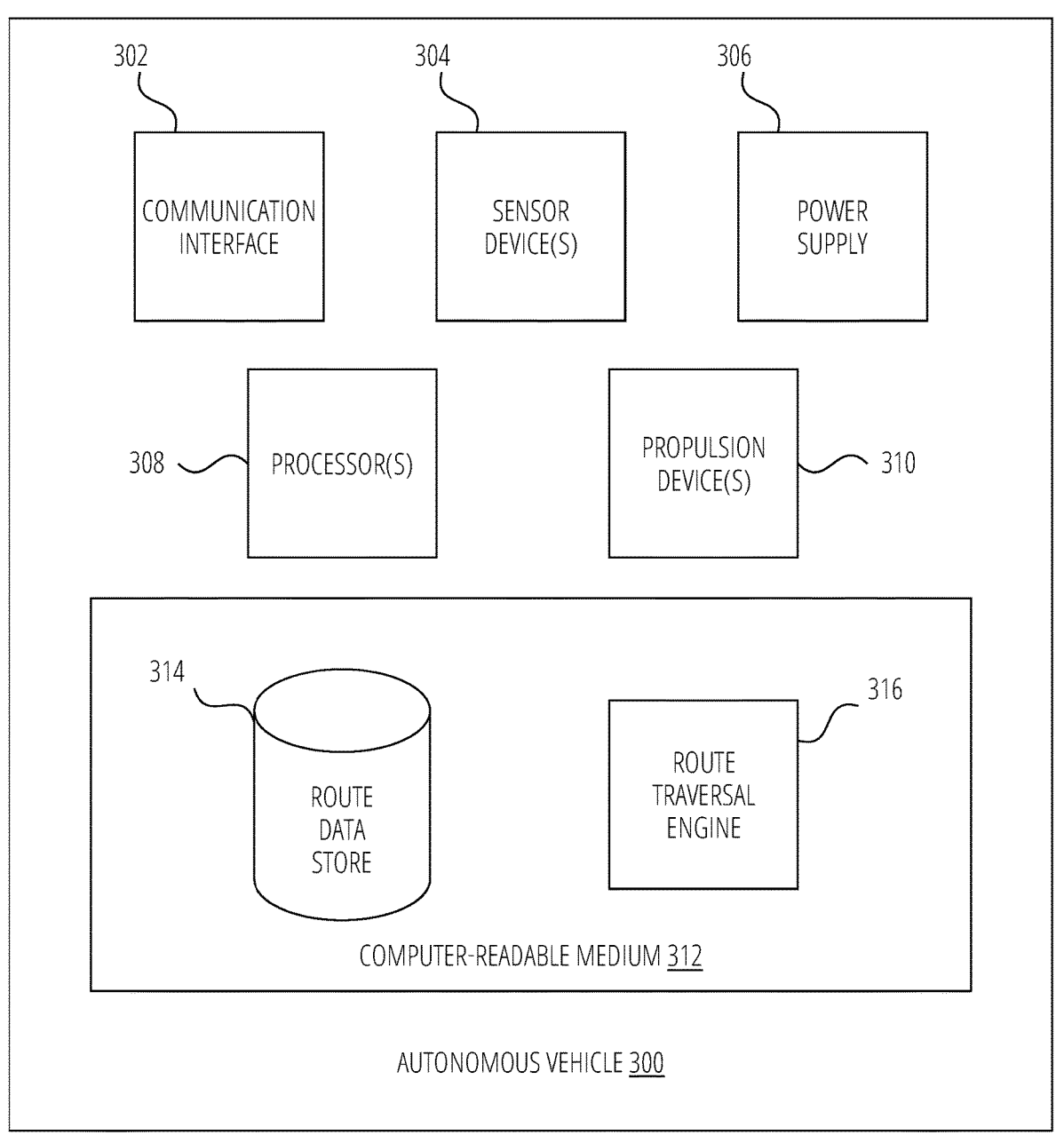
FIG. 3 is a block diagram that illustrates a non-limiting example embodiment of an autonomous vehicle according to various aspects of the present disclosure.

The battery module includes a cavity for housing one or more batteries for powering UAV 100. The avionics module houses flight control circuitry of UAV 100, which may include a processor and memory, communication electronics and antennas (e.g., cellular transceiver, Wi-Fi transceiver, etc.), and various sensors (e.g., global positioning sensor, an inertial measurement unit (IMU), a magnetic compass, etc.). The mission payload module houses equipment associated with a mission of UAV 100. For example, the mission payload module may include a payload actuator for holding and releasing an externally attached payload. In another embodiment, the mission payload module may include a camera/sensor equipment holder for carrying camera/sensor equipment (e.g., camera, lenses, radar, LIDAR, pollution monitoring sensors, weather monitoring sensors, etc.). These and/or other components that may be carried by some embodiments of the UAV 100 are illustrated in FIG. 3.

The illustrated embodiment of UAV 100 further includes horizontal propulsion units 112 positioned on wing assembly 124, which can each include a motor, shaft, motor mount, and propeller, for propelling UAV 100. The illustrated embodiment of UAV 100 includes two boom assemblies 106 that secure to wing assembly 124.

The illustrated embodiments of boom assemblies 106 each include a boom housing 116 in which a boom is disposed, vertical propulsion units 108, printed circuit boards 118, and stabilizers 102. Vertical propulsion units 108 can each include a motor, shaft, motor mounts, and propeller, for providing vertical propulsion. Vertical propulsion units 108 may be used during a hover mode where UAV 100 is descending (e.g., to a delivery location) or ascending (e.g., following a delivery). Stabilizers 102 (or fins) may be included with UAV 100 to stabilize the UAV's yaw (left or right turns) during flight. In some embodiments, UAV 100 may be configured to function as a glider. To do so, UAV 100 may power off its propulsion units and glide for a period of time.

During flight, UAV 100 may control the direction and/or speed of its movement by controlling its pitch, roll, yaw, and/or altitude. For example, the stabilizers 102 may include one or more rudders 104 for controlling the UAV's yaw, and wing assembly 124 may include elevators for controlling the UAV's pitch and/or ailerons 110 for controlling the UAV's roll. As another example, increasing or decreasing the speed of all the propellers simultaneously can result in UAV 100 increasing or decreasing its altitude, respectively. The UAV 100 may also include components for sensing the environment around the UAV 100, including but not limited to audio sensor 122 and audio sensor 114. Further examples of sensor devices are illustrated in FIG. 3 and described below.

Many variations on the illustrated fixed-wing aerial vehicle are possible. For instance, aerial vehicles with more wings (e.g., an "x-wing" configuration with four wings), are also possible. Although FIG. 1 and FIG. 2 illustrate one wing assembly 124, two boom assemblies 106, two horizontal propulsion units 112, and six vertical propulsion units 108 per boom assembly 106, it should be appreciated that other variants of UAV 100 may be implemented with more or fewer of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

FIG. 3 is a block diagram that illustrates a non-limiting example embodiment of an autonomous vehicle 300 according to various aspects of the present disclosure. In some embodiments, the autonomous vehicle 300 is configured to receive a route and to autonomously traverse the route. In some embodiments, the autonomous vehicle 300 is an aircraft (a UAV) such as the UAV 100 illustrated and described above. In other embodiments, any other type of autonomous vehicle 300 capable of navigating along a route, such as a wheeled vehicle, may be used.

As shown, the autonomous vehicle 300 includes a communication interface 302, one or more sensor device(s) 304, a power supply 306, one or more processor(s) 308, one or more propulsion device 310, and a computer-readable medium 312.

In some embodiments, the communication interface 302 includes hardware and software to enable any suitable communication technology for communicating with a fleet management system, a remote pilot interface device, or any other device. In some embodiments, the communication interface 302 includes multiple communication interfaces, each for use in appropriate circumstances. For example, the communication interface 302 may include a long-range wireless interface such as a 4G or LTE interface, or any other type of long-range wireless interface (e.g., 2G, 3G, 5G, or WiMAX), to be used to communicate while traversing a route. The communication interface 302 may also include a medium-range wireless interface such as a Wi-Fi interface to be used when the autonomous vehicle 300 is at an area near a start location or an endpoint where Wi-Fi coverage is available. The communication interface 302 may also include a short-range wireless interface such as a Bluetooth interface to be used when the autonomous vehicle 300 is in a maintenance location or is otherwise stationary and waiting to be assigned a route. The communication interface 302 may also include a wired interface, such as an Ethernet interface or a USB interface, which may also be used when the autonomous vehicle 300 is in a maintenance location or is otherwise stationary and waiting to be assigned a route.

In some embodiments, the sensor device(s) 304 include one or more vehicle state sensor devices configured to detect states of various components of the autonomous vehicle 300, and to transmit signals representing those states to other components of the autonomous vehicle 300. Some non-limiting examples of sensor device(s) 304 include a battery state sensor and a propulsion device health sensor. In some embodiments, the sensor device(s) 304 include one or more environmental state sensor devices configured to determine states of the environment around the autonomous vehicle 300. As a non-limiting example, the one or more environmental state sensor devices may include one or more cameras configured to obtain imagery to be used for route planning, landing area planning, delivery location determination, positioning, obstacle avoidance, and/or any other purpose.

In some embodiments, the power supply 306 may be any suitable device or system for storing and/or generating power. Some non-limiting examples of a power supply 306 include one or more batteries, one or more solar panels, a fuel tank, and combinations thereof. In some embodiments, the propulsion device 310 may include any suitable devices for causing the autonomous vehicle 300 to travel along the path. For an aircraft, the propulsion device 310 may include devices such as, but not limited to, one or more motors, one or more propellers, and one or more flight control surfaces. For a wheeled vehicle, the propulsion device 310 may include devices such as, but not limited to, one or more motors, one or more wheels, and one or more steering mechanisms. In some embodiments, the processor(s) 308 may include any type of computer processor capable of receiving signals from other components of the autonomous vehicle 300 and executing instructions stored on the computer-readable medium 312. In some embodiments, the computer-readable medium 312 may include one or more devices capable of storing information for access by the processor(s) 308. In some embodiments, the computer-readable medium 312 may include one or more of a hard drive, a flash drive, an EEPROM, and combinations thereof.

As shown, the computer-readable medium 312 has stored thereon a route data store 314 and a route traversal engine 316. In some embodiments, the route traversal engine 316 is configured to cause the propulsion devices 310 to propel the autonomous vehicle 300 through a route received from a fleet management system and stored in the route data store 314. The route traversal engine 316 may use signals from the sensor device(s) 304, including but not limited to cameras, GPS sensor devices, vision-based navigation devices, accelerometers, LIDAR devices, and/or other devices that are not illustrated or described further herein, to assist in positioning and navigation as is typical for an autonomous vehicle 300.

One aspect of successfully operating an autonomous vehicle 300, and/or successfully controlling a fleet of autonomous vehicles 300, is creating a route traversal engine 316 that can autonomously complete a variety of routes, in a variety of geographical areas, under a variety of conditions. For many reasons (including but not limited to public safety and difficulty of recovery after failure), it is desirable to develop the route traversal engine 316 in a simulated environment before deploying the route traversal engine 316 on an actual autonomous vehicle 300 to be deployed in uncontrolled public areas. By simulating an autonomous vehicle 300 and allowing the route traversal engine 316 to control the simulated autonomous vehicle 300 within the simulation, the route traversal engine 316 may be updated in order to improve autonomous performance of the autonomous vehicle 300 without encountering the risks of operating test-quality autonomous vehicles 300 in public.

In some embodiments, the simulation of the autonomous vehicle 300 includes providing the route traversal engine 316 with simulated sensor information from simulated sensor device(s) 304, and allowing logic of the route traversal engine 316 to determine control outputs for the propulsion devices 310 based on the simulated sensor information to travel along a route. The simulation also includes simulating dynamics of the autonomous vehicle 300 (e.g., flight dynamics of a UAV 100) based on the control outputs from which the performance of the route traversal engine 316 can be evaluated. The simulation may also include other operational aspects of the route traversal, including but not limited to weather conditions (e.g., wind, clouds, precipitation, ambient temperature, etc.), lighting conditions (e.g., night vs. day, full sun vs. overcast vs. cloudy conditions, etc.), and/or other variable conditions.

In some embodiments, the simulated sensor information received by the route traversal engine 316 includes imagery (e.g., aerial imagery for a UAV 100) that may be used by the route traversal engine 316 for positioning, delivery location determination, route planning, or any other purpose. As used herein, the term "imagery" includes two-dimensional images, three-dimensional images, two-dimensional images combined with depth maps, LIDAR images, RADAR images, or other types of images. In addition to collections of one or more still images, the term "imagery" also includes video.

Figure 4:
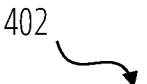
FIG. 4 illustrates a non-limiting example embodiment of aerial imagery captured for use according to various aspects of the present disclosure.
Figure 4:
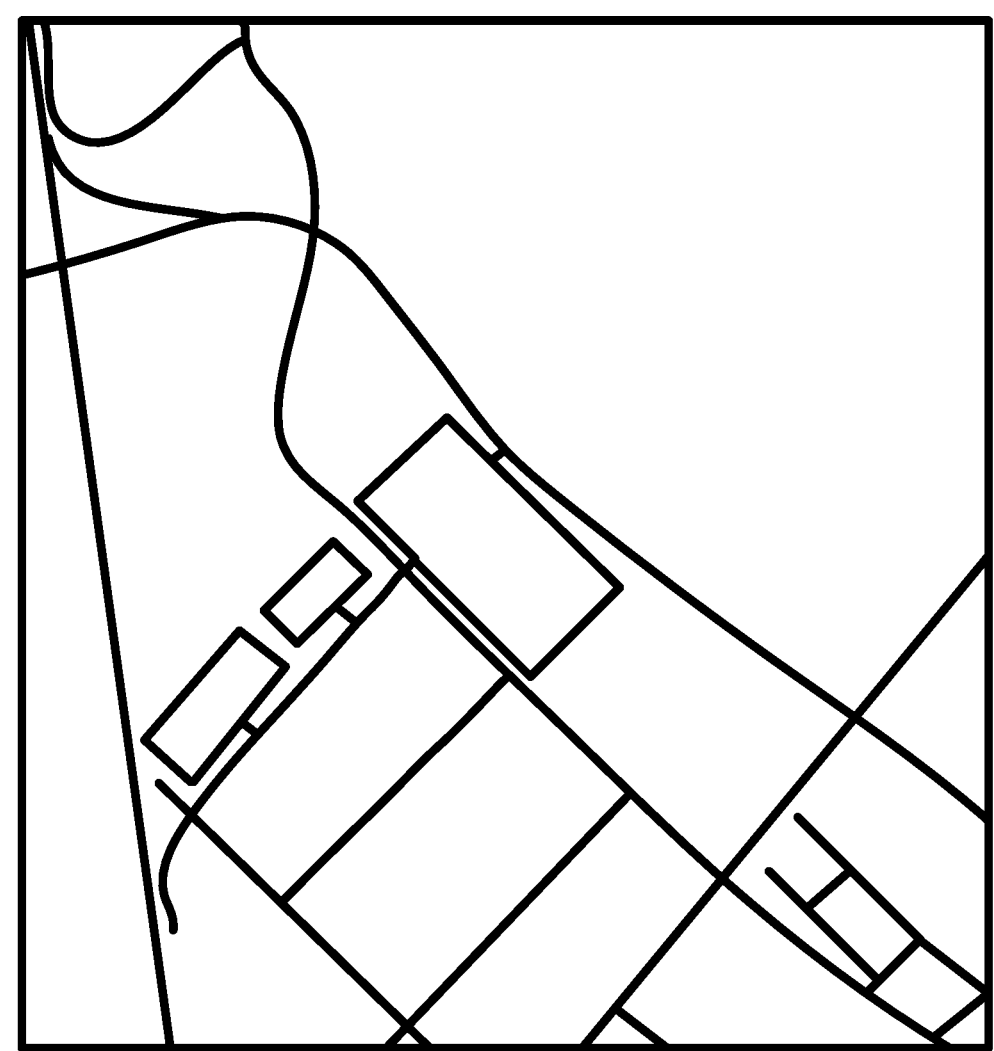

FIG. 4 illustrates a non-limiting example embodiment of aerial imagery captured for use according to various aspects of the present disclosure. The imagery illustrated in FIG. 4 is ground truth aerial imagery 402 of a geographical region. The ground truth aerial imagery 402 will be used in a simulation of autonomous vehicle 300 operation within the geographical region. In some embodiments, ground truth aerial imagery 402 may be captured by one or more UAVs, satellites, manned aircraft, or any other suitable means.

Figure 5:
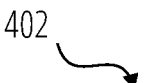
FIG. 5 illustrates a non-limiting example embodiment of the aerial imagery of FIG. 4 with a route to be travelled according to various aspects of the present disclosure.
Figure 5:
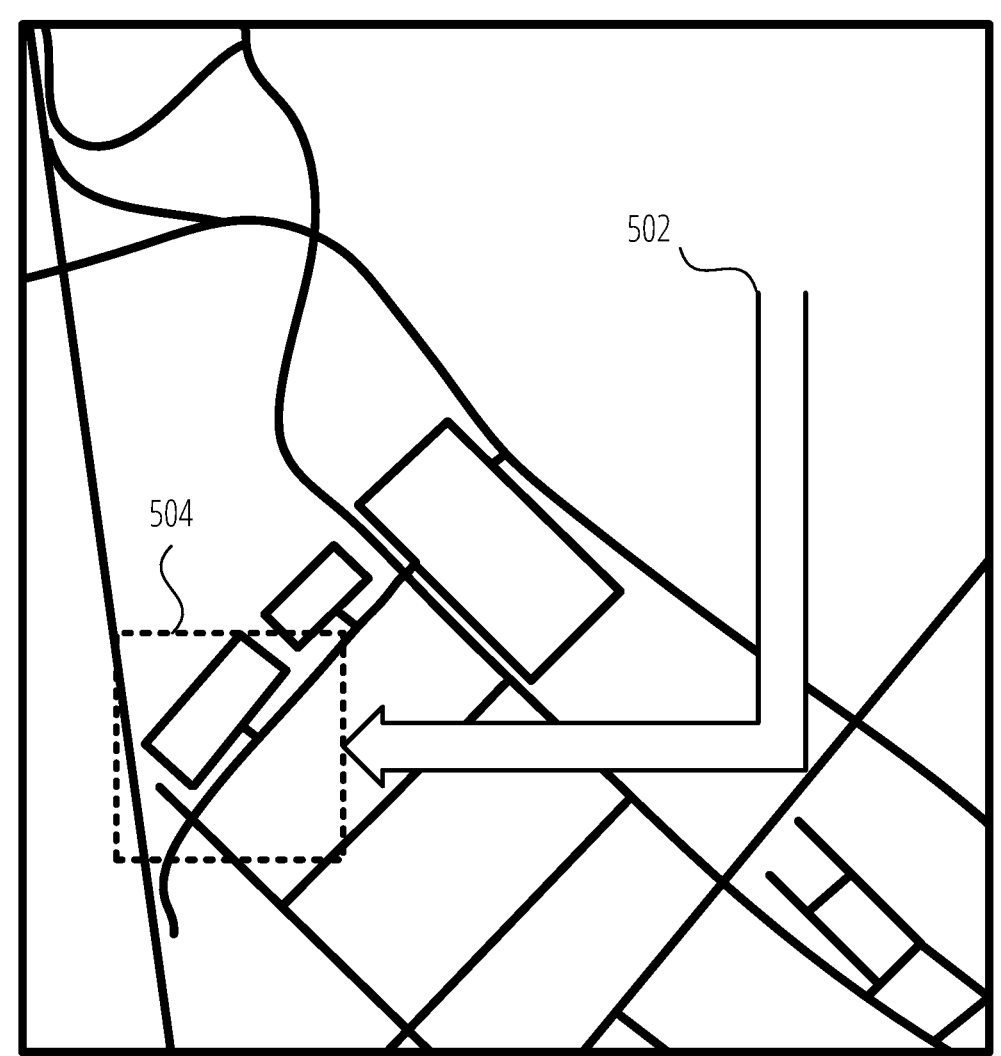

In the simulation of the autonomous vehicle 300, a route to be simulated is determined and is provided to the simulated route traversal engine 316. FIG. 5 illustrates a non-limiting example embodiment of the aerial imagery of FIG. 4 with a route to be travelled according to various aspects of the present disclosure. As shown, the route 502 is positioned within the region of the ground truth aerial imagery 402, and includes a delivery location 504. The route 502 is shown for illustrative purposes, and does not constitute part of the ground truth aerial imagery 402.

Figure 6:
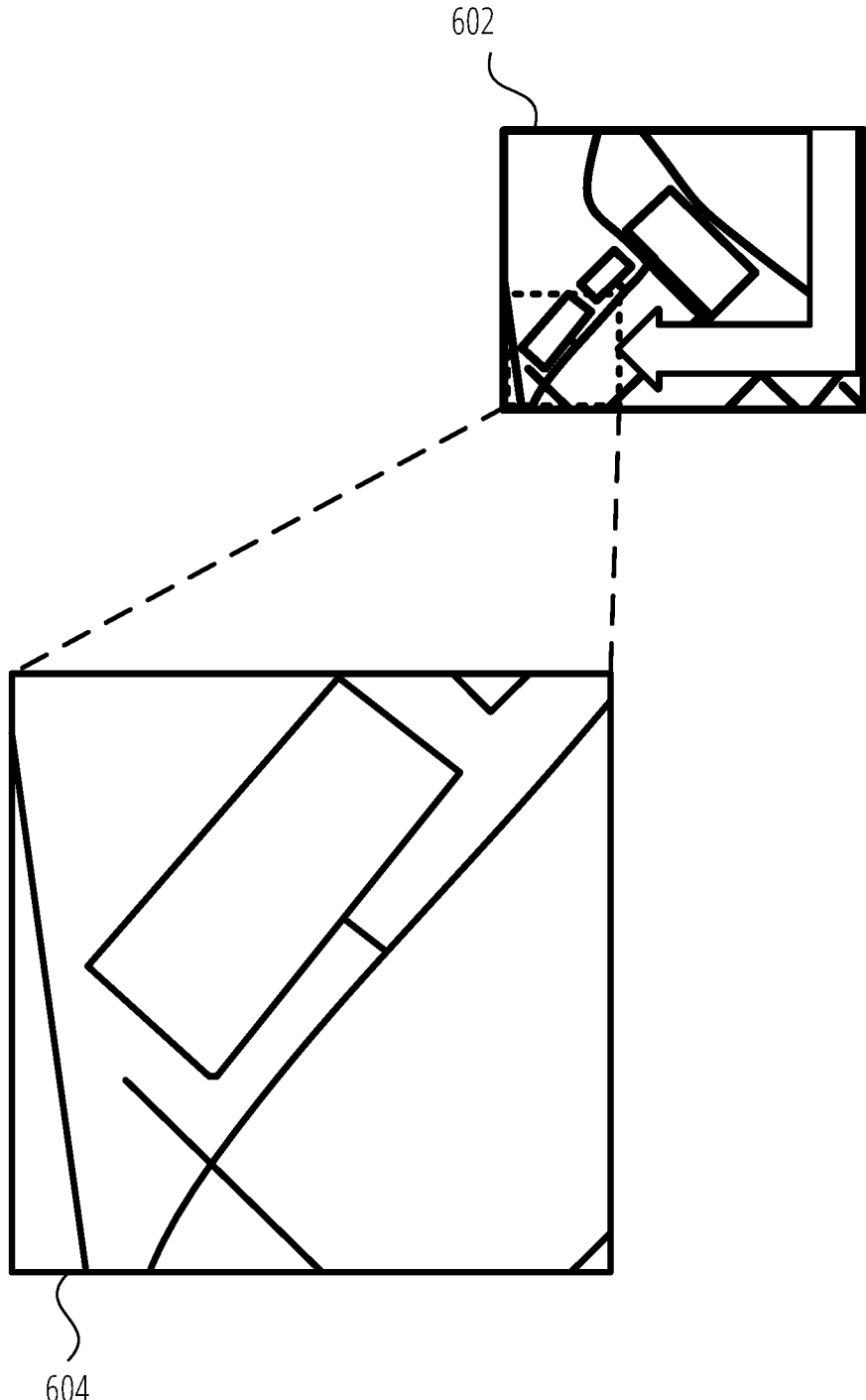
FIG. 6 illustrates a non-limiting example embodiment of predicted aerial imagery according to various aspects of the present disclosure.

In some embodiments, the simulation predicts an area of the ground truth aerial imagery 402 which will be visible to cameras of the simulated autonomous vehicle 300 while traversing the route 502. An portion of the predicted aerial imagery associated with a simulated location of the simulated autonomous vehicle 300 is then provided to the route traversal engine 316 of the simulated autonomous vehicle 300 as part of the simulation. FIG. 6 illustrates a non-limiting example embodiment of predicted aerial imagery according to various aspects of the present disclosure. As shown, the predicted aerial imagery 602 is a portion of the ground truth aerial imagery 402 that is associated with route 502. Also shown is a ground truth detail 604 of a portion of the predicted aerial imagery 602 associated with the delivery location 504, for illustrative purposes.

The use of ground truth aerial imagery 402 as input to simulated UAVs can be effective in developing the route traversal engine 316. However, there are limitations to using this technique. Specifically, the appearance of the region depicted in the ground truth aerial imagery 402 can change during different states. For example, the region may appear different in aerial imagery captured during different weather conditions, during different times of day, during various events within the region, or during other varying states. Despite the differences in appearance during these different states, ground truth aerial imagery of a given region is often only available during a single state, which may lead to the route traversal engine 316 performing well during the single state for which ground truth aerial imagery is available, and performing poorly during other states. What is desirable are autonomous vehicle simulation techniques that allow for the generation and use of simulated imagery of states other than those for which ground truth aerial imagery has been captured, so that the route traversal engine 316 may be adjusted to work well in the other states as well.

Figure 7:
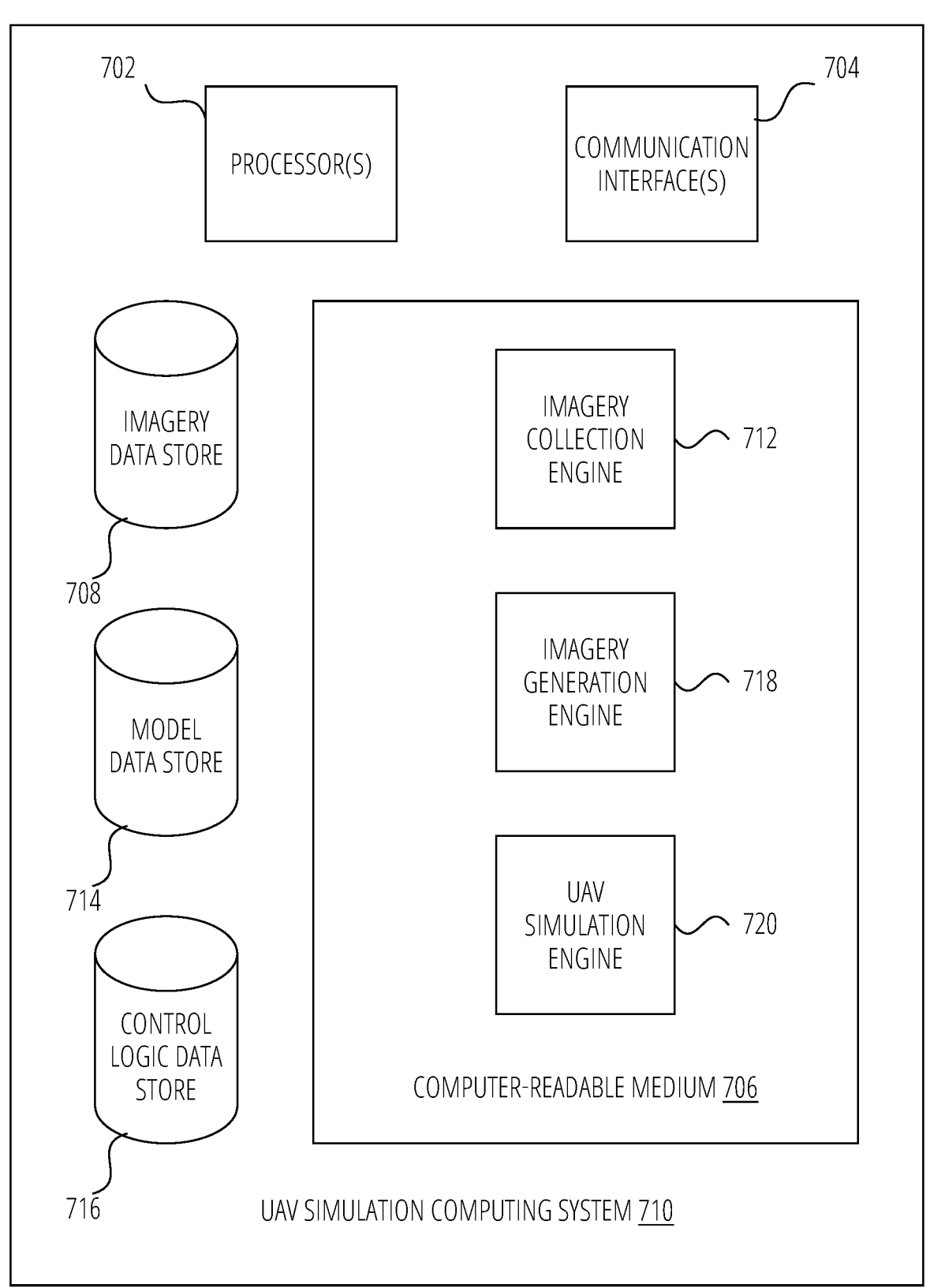
FIG. 7 is a block diagram that illustrates aspects of a non-limiting example embodiment of a UAV simulation computing system according to various aspects of the present disclosure.

FIG. 7 is a block diagram that illustrates aspects of a non-limiting example embodiment of a UAV simulation computing system according to various aspects of the present disclosure. The illustrated UAV simulation computing system 710 may be implemented by any computing device or collection of computing devices, including but not limited to a desktop computing device, a laptop computing device, a mobile computing device, a server computing device, a computing device of a cloud computing system, a computing device incorporated (or configured to be incorporated) into an autonomous vehicle 300, and/or combinations thereof. The UAV simulation computing system 710 is configured to generate simulated aerial imagery based on ground truth aerial imagery, to simulate performance of a UAV using the simulated aerial imagery, and to update logic of a route traversal engine 316 based on the simulated performance in order to improve performance of the route traversal engine 316 for various states of an operation region.

As shown, the UAV simulation computing system 710 includes one or more processors 702, one or more communication interfaces 704, an imagery data store 708, a model data store 714, a control logic data store 716, and a computer-readable medium 706.

In some embodiments, the processors 702 may include any suitable type of general-purpose computer processor. In some embodiments, the processors 702 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 704 include one or more hardware and or software interfaces suitable for providing communication links between components. The communication interfaces 704 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 706 has stored thereon logic that, in response to execution by the one or more processors 702, cause the UAV simulation computing system 710 to provide an imagery collection engine 712, an imagery generation engine 718, and a UAV simulation engine 720.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the imagery collection engine 712 is configured to obtain ground truth aerial imagery of one or more regions for which simulations will be conducted, and to store the aerial imagery in the imagery data store 708. In some embodiments, the imagery generation engine 718 is configured to use one or more machine learning models stored in the model data store 714 to generate simulated aerial imagery based on the ground truth aerial imagery, and to store the simulated aerial imagery in the imagery data store 708.

In some embodiments, the UAV simulation engine 720 is configured to use control logic stored in the control logic data store 716 (such as a route traversal engine 316 or a component thereof) to simulate operation of an autonomous vehicle 300 using at least the simulated aerial imagery, and to update the control logic based on its performance with the simulated aerial imagery. In some embodiments, the UAV simulation engine 720 may include or may be provided within an engine for providing a virtual environment, including but not limited to a game engine such as the Unreal engine or the Unity engine, in which imagery can be applied as textures and a viewpoint can be associated a location of a simulated UAV.

Further description of the configuration of each of these components is provided below.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 8B:
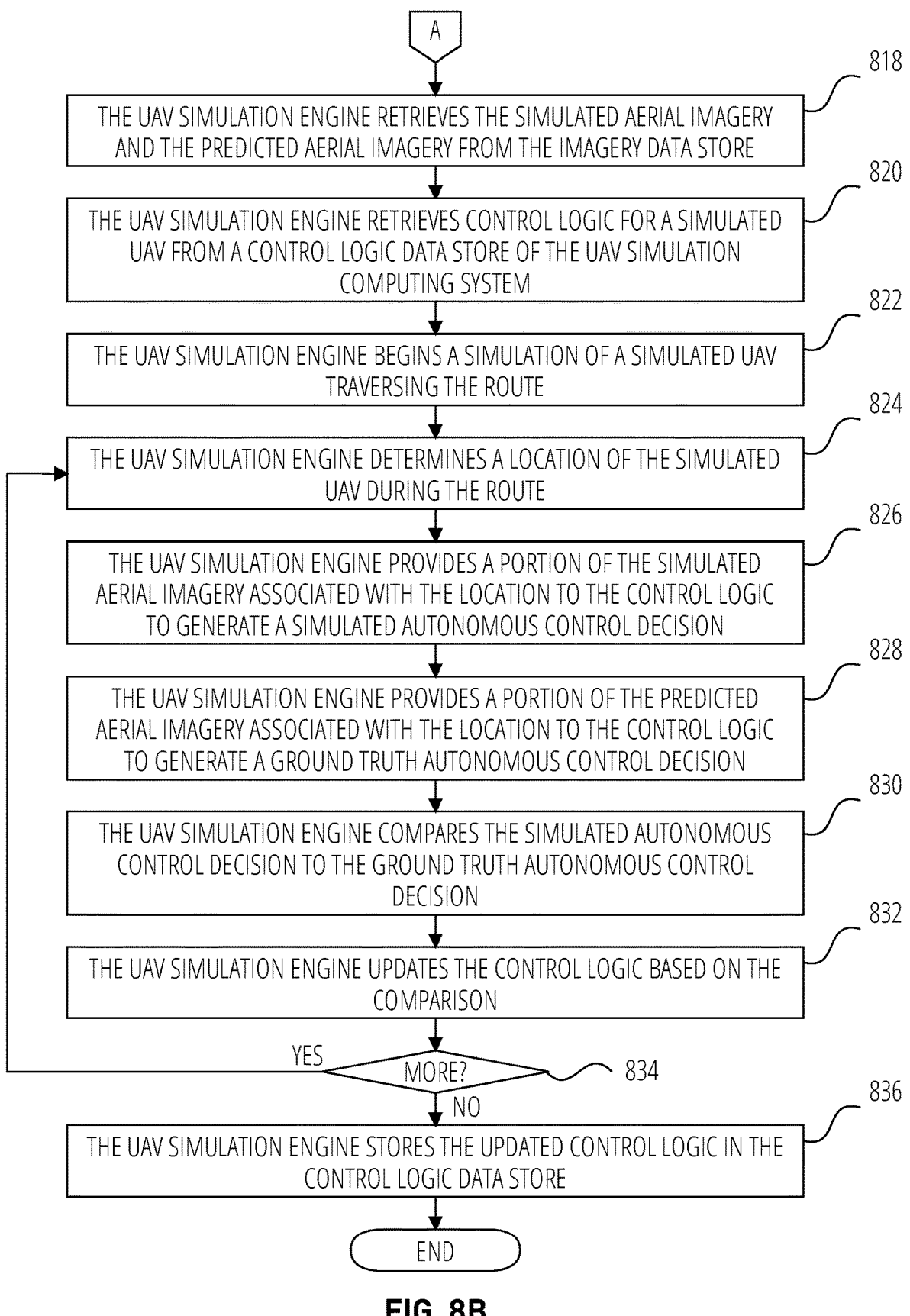

FIG. 8A-FIG. 8B are a flowchart that illustrates a non-limiting example embodiment of a method of verifying and/or improving autonomous control logic of a UAV using simulated imagery according to various aspects of the present disclosure. In the method 800, a UAV simulation computing system 710 generates simulated aerial imagery based on ground truth aerial imagery that depicts a region to be simulated in a different state than the ground truth aerial imagery, and uses the simulated aerial imagery to simulate operation of a UAV 100. The UAV simulation computing system 710 uses the simulated performance of the UAV 100 to verify that the route traversal engine 316 works in a variety of states and/or to update the route traversal engine 316 to improve its performance in the variety of states.

From a start block, the method 800 proceeds to block 802, where an imagery collection engine 712 of a UAV simulation computing system 710 receives ground truth aerial imagery for a region that depicts the region during a first state. A non-limiting example embodiment of such ground truth aerial imagery 402 was illustrated in FIG. 4.

In some embodiments, the ground truth aerial imagery may be received by the imagery collection engine 712 directly from one or more UAVs 100 (or other aircraft or spacecraft) in locations appropriate for collecting aerial imagery of the region. In some embodiments, the imagery collection engine 712 may provide routes to one or more UAVs 100 to cause the UAVs 100 to travel to and collect the ground truth aerial imagery of the region. In some embodiments, the imagery collection engine 712 may not receive the ground truth aerial imagery directly from UAVs 100, but may instead retrieve the ground truth aerial imagery of the region from a data store in which the ground truth aerial imagery is stored after being collected. In some embodiments, the ground truth aerial imagery may be an artificial rendering of a real-world location or an artificial location generated by a computing device.

At block 804, the imagery collection engine 712 stores the ground truth aerial imagery in an imagery data store 708 of the UAV simulation computing system 710. In some embodiments, the imagery collection engine 712 may not store the ground truth aerial imagery in the imagery data store 708, but may instead query another data store in which the ground truth aerial imagery is already stored when it is desired by the UAV simulation computing system 710.

At block 806, a UAV simulation engine 720 of the UAV simulation computing system 710 determines a route for a simulated UAV within the region. In some embodiments, the determined route may be based on an original location of the simulated UAV (e.g., a home base for the simulated UAV, a host vehicle for the simulated UAV, or any other suitable route starting point) and a destination for the route (e.g., a pickup or delivery address, a destination geographical point, or any other suitable route end point). In some embodiments, the UAV simulation engine 720 may determine the path to be traveled for the route, and may use any suitable technique, including but not limited to determining a shortest path, determining a path that avoids various flight restriction areas, determining a path based on capabilities of the simulated UAV (e.g., battery life, performance envelope, etc.), and determining a path based on airspace reservations for other simulated UAVs. In some embodiments, the path to be traveled for the route may be calculated by control logic of the simulated UAV, in which case the UAV simulation engine 720 may simulate execution of the control logic of the simulated UAV to determine the path.

At block 808, an imagery generation engine 718 of the UAV simulation computing system 710 determines predicted aerial imagery that depicts portions of the region associated with the route based on the ground truth aerial imagery in the imagery data store 708. The predicted aerial imagery is a portion of the ground truth aerial imagery that the imagery generation engine 718 determines would be likely to be captured by the simulated UAV while traversing the route or while at a particular location at which the simulated UAV is predicted to be while traversing the route. The predicted aerial imagery is likely a subset of the ground truth aerial imagery, but may constitute the entirety of the ground truth aerial imagery. A non-limiting example embodiment of such predicted aerial imagery 602 was illustrated in FIG. 6.

At block 810, the imagery generation engine 718 stores the predicted aerial imagery in the imagery data store 708. As with the ground truth aerial imagery, in some embodiments, the imagery generation engine 718 may not store the predicted aerial imagery in the imagery data store 708, but may instead query another data store in which the predicted aerial imagery (or the ground truth aerial imagery) is stored when it is desired by the UAV simulation computing system 710.

At block 812, the imagery generation engine 718 retrieves a machine learning model from a model data store 714 of the UAV simulation computing system 710. In some embodiments, the machine learning model has been trained to generate simulated imagery in a second state based on ground truth imagery in a first state. Any suitable type of machine learning model may be used to generate the simulated imagery. One non-limiting example of a suitable type of machine learning model for this image-to-image translation task is a conditional generative adversarial network (Conditional GAN). Another non-limiting example of a suitable type of machine learning model for this image-to-image translation task is a variational auto-encoder (VAE). In some embodiments, different types of machine learning models may be combined into a single machine learning model (e.g., a combined VAE-GAN).

In some embodiments, the first state and the second state may be weather conditions (e.g., the first state may have a clear area and the second state may have accumulated snow, rain/surface water, cloud cover, etc.), lighting conditions (e.g., the first state may be daytime and the second state may be night; the first state may be a sunny day with shadows and the second state may be overcast with no shadows; the first state may be a first time of day or year with shadows at a first angle while the second state may be a second time of day or year with shadows at a second angle; etc.), terrain conditions (e.g., the first state may include summer vegetation such as trees with leaves while the second state may include winter vegetation such as bare trees; the first state may include trimmed vegetation while the second state may include overgrown vegetation, etc.), activities (e.g., the first state may have a clear area and the second state may include movable objects such as humans, vehicles, or temporary structures like tents), structural characteristics (e.g., the first state may have houses with shingled roofs and the second state may have houses with rooftop solar panels), sensor characteristics (e.g., the first state may depict the region using a fully functional sensor, while the second state may depict the region using a sensor or data that experienced data corruption or otherwise less-than-ideal image capture, including but not limited to dead pixels, data loss, high noise, or other types of data corruption; motion blur; lack of focus; inadequate depth of field; glare; lens flare; and over- or under-exposure), or any other types of states. In some embodiments, the first state and the second state may be a type of image. For example, the first state may be two-dimensional imagery, and the second state may be a depth map or three-dimensional imagery. As another example, the first state may be an image from a first viewpoint (e.g., horizontal imagery collected from a ground-based camera) and the second state may be an image from a second viewpoint (e.g., vertical imagery collected from an aircraft or spacecraft).

The machine learning model may be trained using a training data set that depicts the second state for which simulated imagery is desired, which is different from the first state depicted in the ground truth aerial imagery. As a non-limiting example, for states that indicate weather conditions such as a first state that is clear and a second state that includes snow accumulation, the ground truth aerial imagery may depict a clear region and the training data set may depict a region (either the same region, a different region with similar characteristics to the region of the ground truth aerial imagery, or an entirely different region) with snow accumulation. As another non-limiting example, for states that indicate lighting conditions such as a first state that is daytime and a second state that is nighttime, the ground truth aerial imagery may depict the region during the day and the training data set may depict a region (as above, either the same region or a different region) at night. As yet another non-limiting example, for states that indicate activities such as a first state that does not include an activity and a second state that does include an activity that involves the presence of people, vehicles, and/or temporary structures (e.g., a fair, heavy traffic, protest, sporting event, etc.), the ground truth aerial imagery may depict the region with no activity and therefore no people, vehicles, and/or temporary structures, and the training data set may depict the region (as above, either the same region or a different region) during an activity that involves the presence of people, vehicles, and/or temporary structures.

Once trained, the machine learning model accepts an image an as input, and outputs a simulated image that is the input image transformed to appear as if it is captured during the second state instead of the first state. In some embodiments, a different machine learning model may be trained and stored in the model data store 714 for each second state that is desired to be simulated, and the imagery generation engine 718 may retrieve an appropriate machine learning model at block 812 for the second state to be simulated by the method 800. Any suitable training technique may be used, including using an Adam optimizer and/or gradient descent.

At block 814, the imagery generation engine 718 generates simulated aerial imagery that depicts portions of the region associated with the route during a second state by providing the predicted aerial imagery to the machine learning model.

Figure 9:
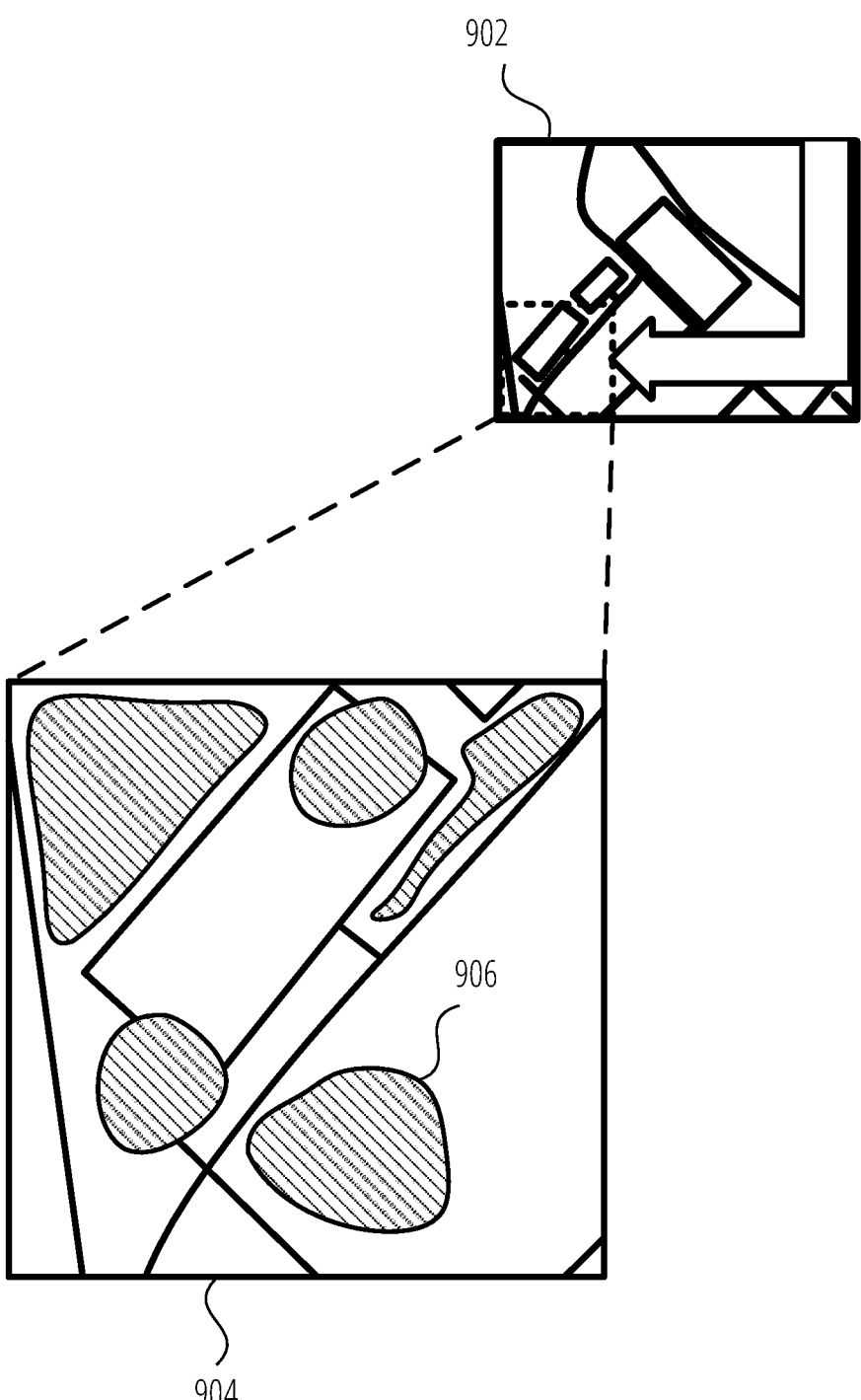
FIG. 9 is an illustration of a non-limiting example embodiment of simulated aerial imagery according to various aspects of the present disclosure.

FIG. 9 is an illustration of a non-limiting example embodiment of simulated aerial imagery according to various aspects of the present disclosure. The simulated aerial imagery 902 illustrated in FIG. 9 is a non-limiting example showing a second state that is different from the first state illustrated in FIG. 6 by virtue of a different weather condition (e.g., snow accumulation vs. clear). As created by the actions at block 814, the simulated aerial imagery 902 is an image-to-image translated version of the predicted aerial imagery 602 illustrated in FIG. 6, as can be seen in the simulated detail 904 where multiple areas of a simulated weather effect 906 (such as snow accumulation) that were added by the machine learning model to create the simulated aerial imagery 902 can be seen.

Figure 10:
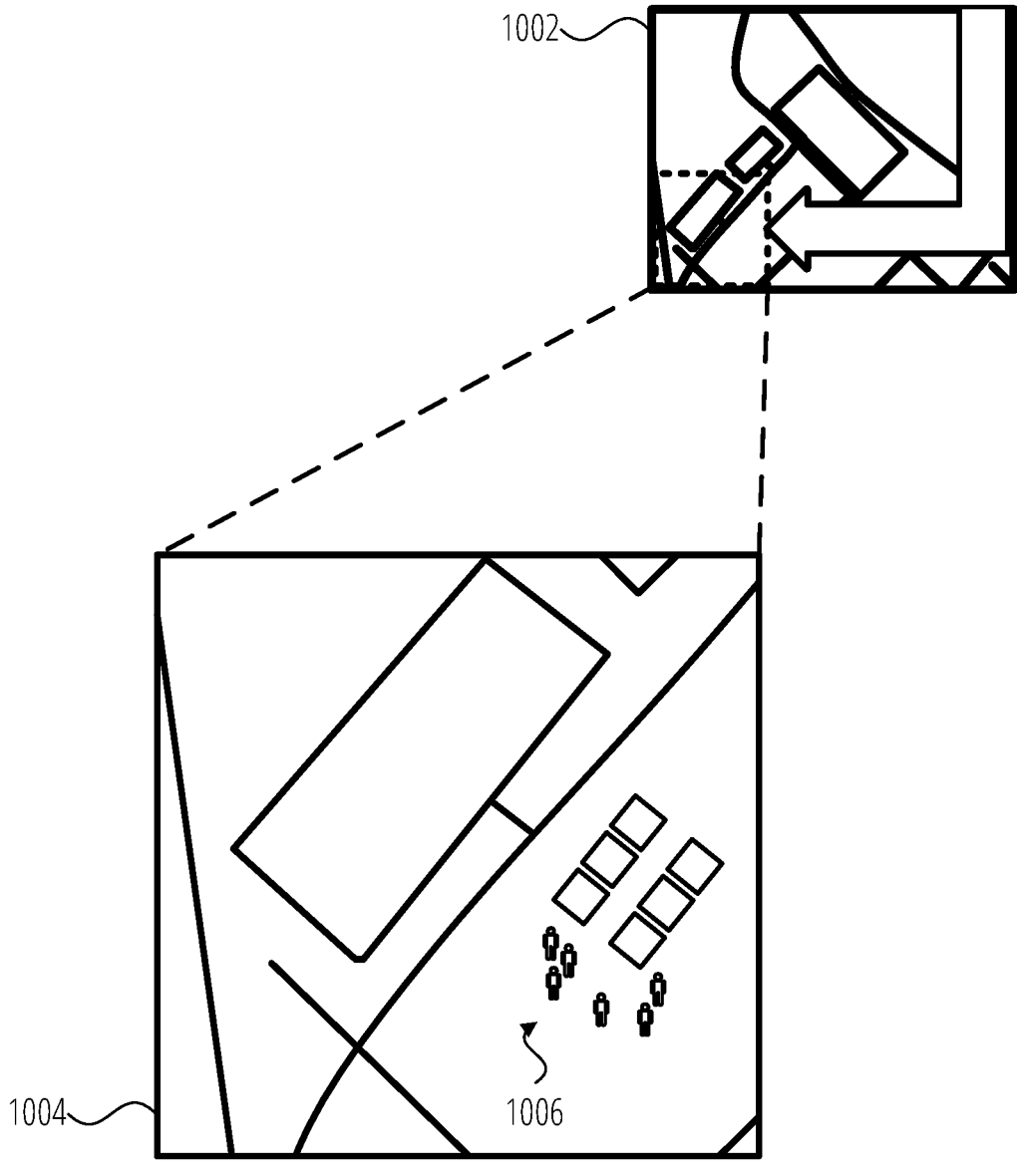
FIG. 10 is an illustration of another non-limiting example embodiment of simulated aerial imagery according to various aspects of the present disclosure.

FIG. 10 is an illustration of another non-limiting example embodiment of simulated aerial imagery according to various aspects of the present disclosure. The simulated aerial imagery 1002 illustrated in FIG. 10 is a non-limiting example showing a second state that is different from the first state illustrated in FIG. 6 by virtue of a different activity (e.g., an activity vs. no activity). As created by the actions at block 814, the simulated aerial imagery 1002 is an image-to-image translated version of the predicted aerial imagery 602 illustrated in FIG. 6, as can be seen in the simulated detail 1004 where multiple simulated objects 1006, including people and tents such as might be seen at a fairground that were added by the machine learning model to create the simulated aerial imagery 1002 can be seen.

Returning to FIG. 8A, at block 816, the imagery generation engine 718 stores the simulated aerial imagery in the imagery data store 708. By storing the simulated aerial imagery and the ground truth aerial imagery from which it was created—both of which depict the same region—in the imagery data store 708, the UAV simulation computing system 710 can provide comparisons of performance of the control logic of the simulated UAV for the region in multiple states in order to allow the control logic to be improved.

The method 800 then proceeds to a continuation terminal ("terminal A"). From terminal A (FIG. 8B), the method 800 proceeds to block 818, where the UAV simulation engine 720 retrieves the simulated aerial imagery and the predicted aerial imagery from the imagery data store 708. In some embodiments, the imagery data store 708 may store simulated aerial imagery and predicted aerial imagery for more than one region and/or more than one second state. Accordingly, the UAV simulation engine 720 may determine a region and a second state to be simulated (e.g., via a user configuration or any other suitable technique), and may retrieve the appropriate predicted aerial imagery and simulated aerial imagery to match the region (for both the predicted aerial imagery and the simulated aerial imagery) and the second state (for the simulated aerial imagery). In some embodiments, predicted aerial imagery and simulated aerial imagery for only a single region and state may be stored in the imagery data store 708, in which case the UAV simulation engine 720 may retrieve all of the predicted aerial imagery and the simulated aerial imagery from the imagery data store 708.

At block 820, the UAV simulation engine 720 retrieves control logic for a simulated UAV from a control logic data store 716 of the UAV simulation computing system 710. The control logic may be an entire route traversal engine 316, or may be logic usable by a route traversal engine 316 or as a portion of a route traversal engine 316 or other autonomous processing logic of an autonomous vehicle 300. For example, the control logic may include one or more of a path planning logic, a position determination logic, a delivery location determination logic, a landing location determination logic, and an object detection logic. In some embodiments, at least a portion of the control logic is configured to accept imagery from one or more sensor device(s) 304 as input and to generate autonomous control decisions in response to the imagery.

At block 822, the UAV simulation engine 720 begins a simulation of a simulated UAV traversing the route. In some embodiments, beginning the simulation may involve instantiating an object that represents the simulated UAV, determining initial location parameters for the simulated UAV within a simulation of the region, determining initial environmental parameters for the simulation (e.g., weather conditions, temperature, wind speed, and/or other environmental parameters that may affect simulated vehicle dynamics), and beginning to simulate vehicle dynamics of the simulated UAV. In some embodiments, the simulation may begin with the simulated UAV in a home base, at a landing area, or otherwise at the start of a route. In some embodiments, the simulation may begin with the simulated UAV in the middle of a route.

At block 824, the UAV simulation engine 720 determines a location of the simulated UAV during the route. In some embodiments, some simulated time may have elapsed between block 822 and block 824, such that the simulated UAV may be positioned at a location along the route. In some embodiments, the actions of block 824 may occur shortly after the actions of block 822, such that the simulated location of the simulated UAV may be at the start of the route. In some embodiments, the location of the simulated UAV is determined based on a simulation of the vehicle dynamics of the simulated UAV from the point the simulation begins at block 822 to the point the location is determined at block 824. The vehicle dynamics of the simulated UAV may include one or more of a velocity; an altitude; a response to one or more control outputs (e.g., speed commands to one or more propulsion devices 310, position commands to actuators for one or more control surfaces such as ailerons 110 and/or rudders 104; commands to a grapple or other payload coupling device, etc.); effects of lift, drag, thrust, and gravity; and/or any other vehicle dynamics characteristics useful for simulating the simulated UAV.

At block 826, the UAV simulation engine 720 provides a portion of the simulated aerial imagery associated with the location to the control logic to generate an autonomous control decision. In some embodiments, the UAV simulation engine 720 determines a portion of the simulated aerial imagery that would be visible to one or more sensor device (s) 304 of the simulated UAV from the location, and provides that portion of the simulated aerial imagery to the control logic. In some embodiments, the UAV simulation engine 720 may consider a pose of the sensor device, a resolution of the sensor device, and/or other factors to determine the field of view of the sensor device (and thereby the portion of the simulated aerial imagery to be provided). In some embodiments, the autonomous control decision is a control output to a device of the simulated UAV, including but not limited to a propulsion device 310, a control surface, or a payload coupler. In some embodiments, the autonomous control decision is a detection of an object, a determination of a delivery location, a determined position, a determined path, or another logical determination that may be generated by the control logic and provided to another portion of the control logic or the route traversal engine 316.

At block 828, the UAV simulation engine 720 provides a portion of the predicted aerial imagery associated with the location to the control logic to generate a ground truth autonomous control decision. In some embodiments, the portion of the predicted aerial imagery coincides with the portion of simulated aerial imagery provided in block 826 (that is, the portion of the predicted aerial imagery depicts a corresponding portion of the region as the portion of the simulated aerial imagery), such that the only difference between the generation of the simulated autonomous control decision and the ground truth autonomous control decision is the state depicted in the input imagery. Also, the ground truth autonomous control decision is a corresponding type of autonomous control decision to the simulated autonomous control decision generated in block 826.

At block 830, the UAV simulation engine 720 compares the simulated autonomous control decision to the ground truth autonomous control decision, and at block 832, the UAV simulation engine 720 updates the control logic based on the comparison. In some embodiments, the ground truth autonomous control decision—which is based on the ground truth aerial imagery depicting the first state—is considered the "correct" behavior for the simulated UAV or the correct value to be determined. As such, the update to the control logic at block 832 may be performed to minimize differences between the simulated autonomous control decision and the ground truth autonomous control decision determined at block 830.

In some embodiments, the comparison between the simulated autonomous control decision and the ground truth autonomous control decision may be of minimal importance in the update to the control logic, and the performance of the simulated autonomous control decision may be independently evaluated for success or failure to decide how the control logic should be updated. For example, if the route includes a delivery to be made and the simulated UAV is using the imagery to determine a delivery location, it may be considered correct for the simulated autonomous control decision to avoid a patch of snow or a puddle that is visible in the simulated aerial imagery but not the ground truth aerial imagery. As another example, if the route includes a path that overflies an area in which the simulated aerial imagery depicts an event with people and temporary structures, it may be considered correct for the simulated autonomous control decision to plan a path that avoids overflying the area while the ground truth autonomous control decision may plan a path that does overfly the area when empty.

In some embodiments, updates to the control logic may be applied automatically by the UAV simulation engine 720. In some embodiments, the UAV simulation engine 720 may present the simulated performance to an engineer to allow the engineer to update the control logic based on the simulated performance. In some embodiments, the updates to the control logic (along with the comparison of the simulated autonomous control decision and the ground truth automated control decision) may be skipped, and the performance of the control logic using the simulated aerial imagery may be evaluated in isolation to simply verify whether the control logic operates successfully using the simulated aerial imagery.

The method 800 then proceeds to decision block 834, where a determination is made regarding whether further simulation of the simulated UAV should be conducted. In some embodiments, the comparison of simulated autonomous control decisions and ground truth autonomous control decisions may be repeated periodically throughout traversal of a route, in which case further simulation should be conducted until the route is complete. In some embodiments, only a portion of traversal of the route would be analyzed, in which case further simulation should be conducted until the end of the portion of the traversal of the route is reached.

If it is determined that further simulation of the simulated UAV should be conducted, then the result of decision block 834 is YES, and the method 800 returns to block 824 to continue the simulation. It should be noted that upon returning to block 824, the UAV simulation engine 720 determines the new location of the simulated UAV based on implementing either the simulated autonomous control decision or the ground truth autonomous control decision, such that the effect of one of these autonomous control decisions is included in the simulation. Otherwise, if the simulation has been completed, then the result of decision block 834 is NO, and the method 800 advances to block 836.

At block 836, the UAV simulation engine 720 stores the updated control logic in the control logic data store 716. In some embodiments, the UAV simulation computing system 710 may provide the updated control logic to one or more UAVs 100 in a fleet of UAVs 100 in order to improve the performance of the UAVs 100 in a variety of states.

The method 800 then proceeds to an end block and terminates.

As illustrated and described in FIG. 8A—FIG. 8B, the method 800 operates to improve performance of the control logic in a second state for which ground truth aerial imagery is not available. In some embodiments, the method 800 may be operated multiple times for multiple different second states for the same control logic in order to improve performance of the control logic in a variety of different second states. In some embodiments, the method 800 may be used to update multiple different control logics to be stored in the control logic data store 716, and a given UAV 100 may be provided with an appropriate control logic from the control logic data store 716 to match conditions expected to be encountered by the given UAV 100 during a specific route (e.g., providing a control logic for snow when snow is expected). In some embodiments, a given UAV 100 may be provided with multiple control logics from the control logic data store 716, and the given UAV 100 may choose between the control logics as appropriate for an encountered condition.

The method 800 as illustrated in FIG. 8A-FIG. 8B also assumes that the internal states of the simulation (e.g., a location, velocity, etc. of the simulated UAV at a given time) with respect to the first state and the second state remain substantially synchronized, in that one of the autonomous control decisions is chosen to be simulated even though both the simulated autonomous control decision and the ground truth autonomous control decision are calculated. In some embodiments, implementation of the differing autonomous control decisions may cause the simulation to diverge for the first state and the second state. In such embodiments, a full simulation (or a portion thereof) may be conducted for each of the predicted aerial imagery and the simulated aerial imagery, and corresponding portions of the simulations may be compared in order to update the control logic.

Though the preceding description primarily relates to UAVs 100, the use of these techniques with autonomous vehicles 300 that are UAVs 100 should not be seen as limiting. In some embodiments, similar techniques may be used in other types of autonomous vehicles 300, including but not limited to other types of autonomous aircraft, autonomous cars, autonomous trucks, and autonomous watercraft.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by a computing system, causes the computing system to perform actions for simulating an unmanned aerial vehicle (UAV) to improve control system performance, the actions comprising:

obtaining, by the computing system, ground truth aerial imagery for a region, wherein the ground truth aerial imagery depicts the region during a first state;

determining, by the computing system, a route for a simulated UAV within the region;

generating, by the computing system based on the ground truth aerial imagery, predicted aerial imagery that depicts portions of the region associated with the route during the first state;

generating, by the computing system, simulated aerial imagery that depicts portions of the region associated with the route during a second state different from the first state by providing the predicted aerial imagery to a machine learning model;

simulating, by the computing system, travel of the simulated UAV along the route during the second state by providing the simulated aerial imagery as simulated input to at least one control system of the simulated UAV, and determining a simulated autonomous control decision generated by the at least one control system based on a given portion of the simulated aerial imagery during the simulated travel during the second state, wherein the simulated autonomous control decision generated by the at least one control system includes one or more of a landing location, a delivery location, a position, a path, or a command to an actuator or propulsion device;

simulating, by the computing system, travel of the simulated UAV along the route during the first state by providing the predicted aerial imagery as simulated input to the at least one control system of the simulated UAV, and determining a ground truth autonomous control decision generated by the at least one control system based on a portion of the predicted aerial imagery corresponding to the given portion of the simulated aerial imagery during the simulated travel during the first state, wherein the ground truth autonomous control decision generated by the at least one control system includes one or more of a ground truth landing location, a ground truth delivery location, a ground truth position, a ground truth path, or a ground truth command to the actuator or propulsion device; and updating, by the computing system, the at least one control system based on the simulated autonomous control decision by comparing one or more of the landing location, the delivery location, the position, the path, or the command to the actuator or propulsion device of the simulated autonomous control decision to one or more of the ground truth landing location, the ground truth delivery location, the ground truth position, the ground truth path, or the ground truth command to the actuator or propulsion device of the ground truth autonomous control decision.

2. The non-transitory computer-readable medium of claim 1, wherein updating the at least one control system based on the autonomous control decision includes at least one of updating logic for determining landing locations, updating logic for determining delivery locations, updating logic for determining positions, updating logic for path determination, and updating logic for generating commands to an actuator or propulsion device.

3. The non-transitory computer-readable medium of claim 1, wherein the machine learning model is a conditional generative adversarial network (Conditional GAN).

4. The non-transitory computer-readable medium of claim 1, wherein the first state is a first weather condition and the second state is a second weather condition.

5. The non-transitory computer-readable medium of claim 1, wherein the first state is a first lighting condition and the second state is a second lighting condition.

6. The non-transitory computer-readable medium of claim 1, wherein the first state is an absence of movable objects and the second state is a presence of movable objects.

7. The non-transitory computer-readable medium of claim 6, wherein the movable objects include at least one of humans, vehicles, and structures.

8. The non-transitory computer-readable medium of claim 1, wherein the simulated aerial imagery includes simulated video imagery.

9. A computer-implemented method for simulating an unmanned aerial vehicle (UAV) to improve control system performance, the method comprising:

obtaining, by a computing system, ground truth aerial imagery for a region, wherein the ground truth aerial imagery depicts the region during a first state;

determining, by the computing system, a route for a simulated UAV within the region;

generating, by the computing system based on the ground truth aerial imagery, predicted aerial imagery that depicts portions of the region associated with the route during the first state;

generating, by the computing system, simulated aerial imagery that depicts portions of the region associated with the route during a second state different from the first state by providing the predicted aerial imagery to a machine learning model;

simulating, by the computing system, travel of the simulated UAV along the route during the second state by providing the simulated aerial imagery as simulated input to at least one control system of the simulated UAV, and determining a simulated autonomous control decision generated by the at least one control system based on a given portion of the simulated aerial imagery during the simulated travel, wherein the simulated autonomous control decision generated by the at least one control system includes one or more of a landing location, a delivery location, a position, a path, or a command to an actuator or propulsion device;

simulating, by the computing system, travel of the simulated UAV along the route during the first state by providing the predicted aerial imagery as simulated input to the at least one control system of the simulated UAV, and determining a ground truth autonomous control decision generated by the at least one control system based on a portion of the predicted aerial imagery corresponding to the given portion of the simulated aerial imagery, wherein the ground truth autonomous control decision generated by the at least one control system includes one or more of a ground truth landing location, a ground truth delivery location, a ground truth position, a ground truth path, or a ground truth command to the actuator or propulsion device; and updating, by the computing system, the at least one control system based on the simulated autonomous control decision by comparing one or more of the landing location, the delivery location, the position, the path, or the command to the actuator or propulsion device of the simulated autonomous control decision to one or more of the ground truth landing location, the ground truth delivery location, the ground truth position, the ground truth path, or the ground truth command to the actuator or propulsion device of the ground truth autonomous control decision.

10. The computer-implemented method of claim 9, wherein updating the at least one control system based on the autonomous control decision includes at least one of updating logic for determining landing locations, updating logic for determining delivery locations, updating logic for determining positions, updating logic for path determination, and updating logic for generating commands to an actuator or propulsion device.

11. The computer-implemented method of claim 9, wherein the machine learning model is a conditional generative adversarial network (Conditional GAN).

12. The computer-implemented method of claim 9, wherein the first state is a first weather condition and the second state is a second weather condition.

13. The computer-implemented method of claim 9, wherein the first state is a first lighting condition and the second state is a second lighting condition.

14. The computer-implemented method of claim 9, wherein the first state is an absence of movable objects and the second state is a presence of movable objects.

15. The computer-implemented method of claim 14, wherein the movable objects include at least one of humans, vehicles, and structures.

16. The computer-implemented method of claim 9, wherein the simulated aerial imagery includes simulated video imagery.

\*    \*    \*    \*    \*